Figure 1:
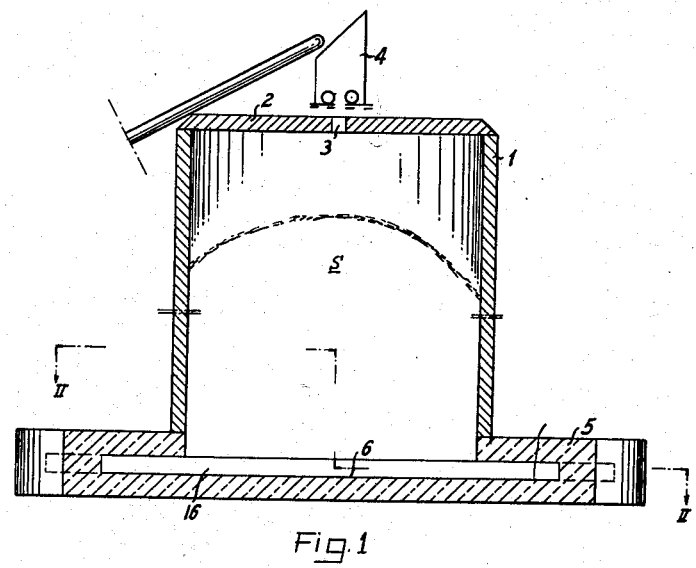

May 11, 1965  J. SCHLEICH  3,182,824
SILO, USED FOR THE PRESERVATION OF GREEN FODDER
Filed March 29, 1962

INVENTOR.
JOSEF SCHLEICH

3,182,824
SILO, USED FOR THE PRESERVATION OF GREEN FODDER
Josef Schleich, Ansbach, Middle Franconia, Germany, assignor to Louis Schierholz, Bremen-Kattenturm, Germany
Filed Mar. 29, 1962, Ser. No. 188,001
4 Claims. (Cl. 214—17)

This invention relates to a silo, particularly one used for the preservation of green fodder, having an opening disposed in the wall of the silo for delivery of the silage and a conveyor arm being pivotally mounted about a vertical axis, and further being movable above the floor of the silo to convey the silage from one end of the arm to the other.

In the known installations of this type the axis of the conveyor arm is positioned in the center of the circular shaped silo floor and the silage is carried by the conveyor arm rotated radially and thereby moving the silage towards a trough running from the center of the silo floor communicating with the side opening of the silo tower, this trough accommodating another additional conveyor device which in turn moves the silage longitudinally along the trough through the side opening to the respective feeding places. Devices for unloading silage from a silo tower are described in applications of Leonard E. Broberg et al., Patent No. 2,764,320 entitled "Adjustable Hood for Unloader Trough of a Storage Tank" and Erwin G. Dueringer, Patent No. 2,718,970 entitled "Method of Unloading Stored Material and Apparatus Therefor."

Experience has shown that the above arrangement in combining a rotating conveyor arm with a fixedly mounted conveyor device will result in frequent break-downs which are mainly due to the heavily filled silo and the fact that the accumulated fodder tends to block the conveyor arm under its own weight and so the operation of the conveyor system is severely hindered. It is also a noticeable set-back of the known devices that as the conveyor arm is constantly subject to the load represented by the mass of the silage, the commencing of the conveying operation is difficult under this load. These known devices have further the disadvantage that their construction tends to be complicated and expensive in nature.

In order to obviate the above disadvantages, according to the present invention, the conveyor arm is pivotally mounted about a vertical axle disposed close to the side opening of the silo tower, the axle being arranged so as to allow a circular sector of the silo floor to be covered by the swivelling conveyor arm. Thus, it is possible to use only one pivotable conveyor arm which conveys the silage to the side opening with the further advantage that the pivotally mounted shaft of the conveyor arm and its associated driving mechanism may be arranged outside of the silo tower, thereby offering the simplicity of construction and the ease of operation and maintenance. Furthermore, the swivelling range of the conveyor arm can be adjusted so that part of this range is outside of the silage column. For that purpose, one or more recesses may be provided above the floor of the silo tower enclosing the silage column and allowing the conveyor arm to occupy its swivelling end positions being partly relieved of the load represented by the weight of the silage column. According to the present invention the above feature allows insertion and removal of the conveyor arm greatly facilitating the inspection or cleaning of same.

During the swivelling of the conveyor arm, the end of which is adjacent to the side opening disposed in the wall of the silo tower, will describe an arcuate path of movement thereby allowing the conveyed material to be transferred onto any other transport means provided in level spaced relationship with the silo floor to effect the further transport of the dislodged silage. According to the present invention, on commencing the conveying operation the conveyor arm comes gradually in contact with the lowest layer of the silage column thereby contributing to an even distribution of the silage over the full length of the conveyor arm which in turn means the effective delivery of same.

The axis around which the conveyor arm describes its swivelling movement may be positioned on a cart or the like to effect the easy removal or insertion of the conveyor arm. Due to the easy and quick interchangeability of the conveyor arm, this arrangement offers the further advantage that the conveyor arm can also be used for other silos.

Figure 2:
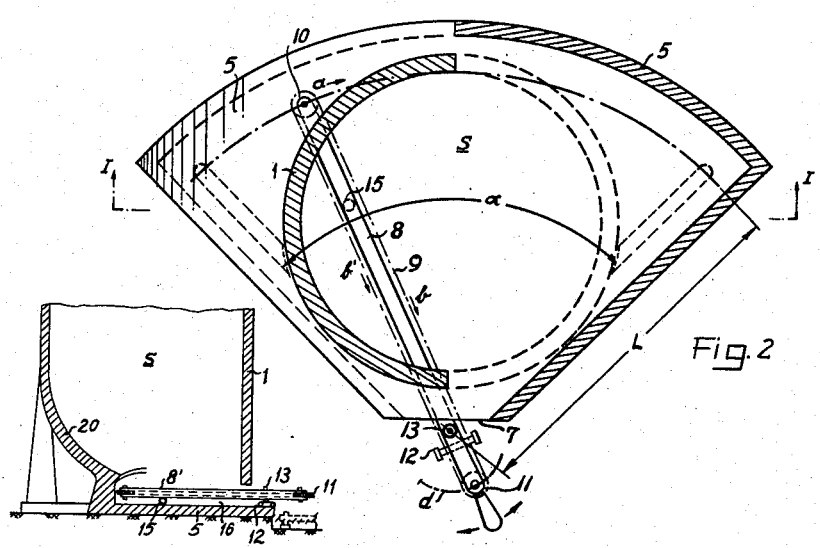
Figure 4:
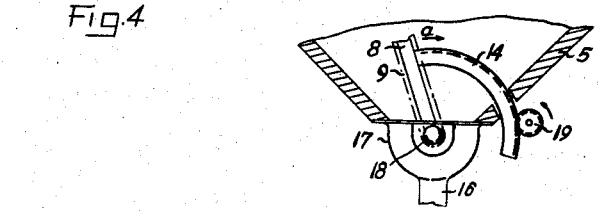
Figure 3:
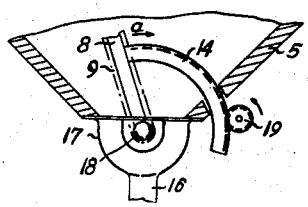

The invention will now be explained by way of examples with reference to the accompanying drawing, in which:

FIG. 1 is a vertical section taken along line I—I of FIG. 2, showing a silo tower with its bottom floor according to the invention, FIG. 2 is a horizontal section taken along line II—II of FIG. 1 showing the conveyor arm in its operating position, FIG. 3 is the top plan view of a modified form of the driving mechanism for the actuation of the conveyor arm, and FIG. 4 is a vertical section of the lower part of a silo tower, showing the modified floor in accordance with the invention.

The arrangement as shown in FIG. 1 serves for the storage of silage S of green fodder. It consists of a silo tower 1, the cover 2, which is provided with a filling opening 3 and a filling device 4. As shown in FIG. 2, the removal of the stored material S is effected through a side opening 7 arranged in the circular sector shaped base 5 above the floor 6 of the silo tower. An unloading device is arranged through the side opening 7 of the silo tower.

The unloading device consists of a conveyor arm 8 provided with a conveying chain 9 which runs over sprocket wheels 10 and 11 provided on both ends of the conveyor arm 8. The chain 9 is driven by the outer sprocket wheel 11 which in turn is actuated by a driving motor (not shown). The chain 9 may be provided in the usual manner with scrapers and cutters for the dislodgement and delivery of the silage S through the side opening 7. The conveyor arm 8 is disposed on a cart 12 and is pivotable about a vertical axis 13. The swivelling of the conveyor arm can be effected either mechanically or manually by means of a handle 14 being disposed at the outer end of the conveyor arm 8. For the purpose of mechanical actuation of the conveyor arm there may be provided hydraulically operated mechanisms (not shown).

The working and the swivelling range of the conveyor arm 8 is determined by the length L measured from the axis 13 to the sprocket wheel 10 provided at the inner end of the arm and by its swivelling angle α. Recess 16 is provided in the base 5 of the silo tower in which the swivelling movement of the conveyor arm 8 can take place in the full range represented by the angle α.

The swivelling arm passes over the floor 6 of the silo tower by evenly cutting and scraping those layers which are in front of the gradually advancing conveyor arm maintaining an equal distribution of the silage S over the full length of the conveyor chain 9.

As described above, the swivelling end positions—shown by dotted lines in FIG. 2—of the conveyor arm 8 are partly outside of the silage column S being in the recess 16 enclosing the silage column S, so that the easy removal or insertion of same can be easily effected.

The sprocket wheel 11 provided on the outer end of the conveyor arm 8 is outside of the silo tower and during the swivelling movement of the arm it describes an arcuate path $d$. This protrusion of the conveyor arm allows to provide suitable transportation means to effect the further transport of the appearing silage S through the side opening 7. The side of the conveyor arm 8 facing the floor 6 of the silo tower is provided with one or more rollers 15 which greatly facilitate the swivelling movement of said arm.

In actual operation the conveyor arm is moved by the handle (not shown) slowly back and forth over the swivelling range. At the same time the conveyor chain 9 rotates and thus conveys the lowest layer of the silage column S lying on the floor 6 to the side opening 7. The rotation of the conveyor chain 9 may be reversed by the actuating mechanism of the sprocket wheel 11. When swivelling of the conveyor arm to the right in direction of arrow $a$ is effected, the conveyor chain 9 rotates in direction of arrow $b$ and as soon as the extreme position within the swivelling range $\alpha$ is reached and swivelling of the arm commences to the left, the chain will rotate in direction of arrow $b'$. This mode of operation ensures the most effective conveying of the silage towards the side opening 7.

In the embodiment as shown in FIG. 3 there is provided a drive for the conveyor arm in the form of a toothed quadrant 14 and a pinion gear 19. This quadrant is fixedly secured to the conveyor arm 8 within the silo tower and allows also the above described operation of the conveyor arm to be carried out. In this case there is provided adjacent to the side opening 7 a suction channel 16 with a head piece 17 enclosing the outer end of the conveyor arm and its actuating mechanism almost air-tight. The actuating means of pinion gear 19 may be used to drive an air-pump (not shown) which further communicates with an air-inlet 18 provided on the head-piece 17. The silage S delivered by the conveyor arm 8 to the head-piece 17 is sucked by the air-stream, thus effecting not only the further transport of the silage, but also resulting in that the conveyor is completely relieved from the conveyed materials. The suction channel may be connected directly to a distributing device (not shown) leading to the respective feeding places.

As shown in FIG. 4, the swivelling range lies directly under the silage column S in which case it is advantageous to provide an arched and inclined floor 20 for the silo tower, in order to effect the silage S to fall or slide into the area in which the shortened conveyor arm 8' is effectively movable.

It is possible within the scope of the invention to provide various forms of actuating means for the conveyor arm, i.e. a quadrant, a chain or the like connected to the inner end of the conveyor arm being outside of the silage column S or even close to the periphery of the silage column.

Various embodiments of the invention may be employed within the scope of the following claims.

I claim:
1. A combination comprising a storage silo and a means for unloading a silo,
   said silo comprising a substantially vertical wall for enclosing and storing a silage column,
   said vertical wall comprising a recess at a base thereof, with said recess defining an opening of cross sectional area greater than the cross sectional area of said column,
   said means for unloading a silo comprising a conveyor arm extending into said opening below said silage column and mounted on a pivot point located for lateral swinging beneath both said silage column and portions of said wall of said conveyor arm about a substantially vertical axis outside said column.

2. A combination comprising a storage silo and a means for unloading said silo,
   said silo comprising a circular wall for storing a silage column of green fodder,
   said wall defining a first cross sectional area,
   and a base for said wall having a recess with a cross sectional area greater than said first cross sectional area,
   said unloading means comprising a conveyor arm mounted to swing laterally about an axis located adjacent and outside of said circular wall,
   said conveyor arm undergoing said wall and swinging in said recess over an angle the limits of which encompass a lower circular portion of said circular wall.

3. A silo in accordance with claim 2 wherein said swinging angle is larger than a second angle subtended by the inside diameter of said circular wall,
   the vertex of said scond angle coinciding with that of said swinging angle, said recess accommodating said conveyor arm in extremes of its swinging area.

4. A silo in accordance with claim 2 wherein said base is sector shaped.

References Cited by the Examiner
UNITED STATES PATENTS

| | | |
|---|---|---|
| 1,165,760 | 12/15 | Craine. |
| 1,570,085 | 1/26 | Saxe. |
| 2,058,125 | 10/36 | Bean _____ 198—213 |
| 2,799,407 | 7/57 | Vanier et al. |
| 2,930,498 | 3/60 | Felbeck. |
| 2,969,156 | 1/61 | Miller et al. |
| 3,035,718 | 5/62 | Behlen. |
| 3,088,606 | 5/63 | Schaefer. |

HUGO O. SCHULZ, *Primary Examiner.*